March 31, 1953 J. RADUS 2,633,002
BRAKE SYSTEM BLEEDER AND FLUID SUPPLY MEANS
Filed March 6, 1951
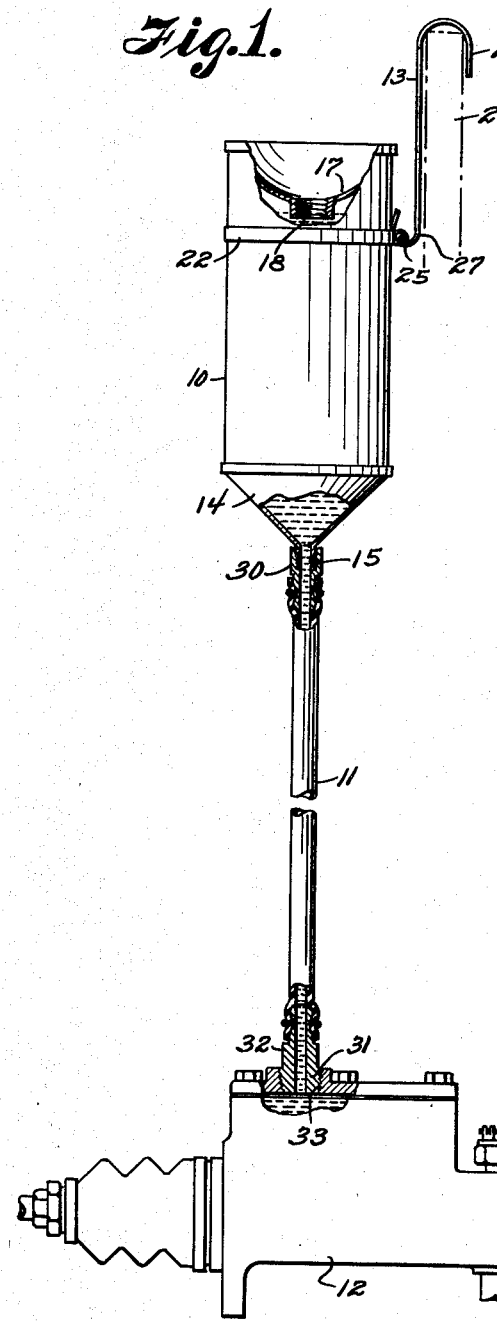
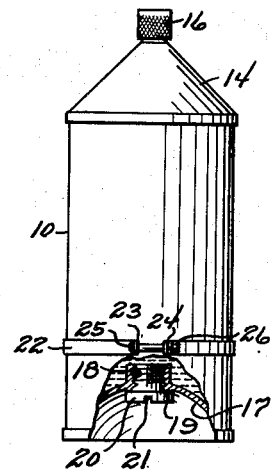
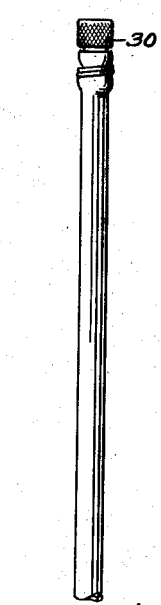
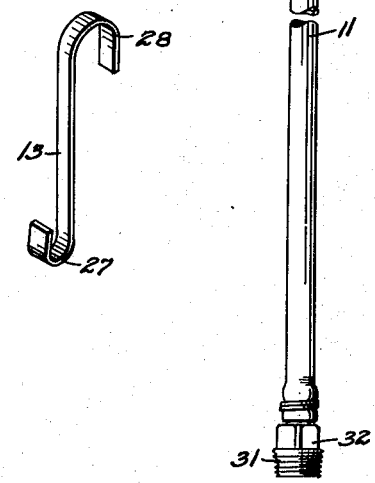
INVENTOR.
Joseph Radus
BY Victor J. Evans & Co.
ATTORNEYS Patented Mar. 31, 1953

2,633,002

UNITED STATES PATENT OFFICE 2,633,002

BRAKE SYSTEM BLEEDER AND FLUID SUPPLY MEANS

Joseph Radus, Turtle Creek, Pa.

Application March 6, 1951, Serial No. 214,179

2 Claims. (Cl. 60—54.6)

This invention relates to tools or devices used in repairing brake systems of motor vehicles, where it is necessary to drain the brake fluid from the line, and in particular a brake fluid container having a feeder tube removably attached to one end for supplying fluid from the container to the master cylinder of a vehicle and in which a funnel like cavity is provided in the opposite end to facilitate draining brake fluid from the system into the container.

The purpose of this invention is to facilitate draining brake fluid from brake lines of motor vehicles when it is necessary to repair connections in the line or in the brake cylinders and where it is necessary to retain the brake fluid in the master cylinder in order to drain a fluid from the line.

In the conventional method of bleeding or draining brake fluid from lines of motor vehicles it is necessary to replace the fluid in the master cylinder several times during a draining operation and as master cylinders are positioned below the floor boards in front of the front seats of vehicles where they are substantially inaccessible the refilling operation requires considerable time and annoyance. With this thought in mind this invention contemplates a container with suitable connections for maintaining a supply of brake fluid in a master cylinder of the brake system whereby an entire line may be drained in one operation.

The object of this invention is, therefore, to provide a brake fluid container having suitable connecting elements whereby the container may be connected to a brake cylinder and suspended in a vehicle in a position for supplying brake fluid to the master cylinder.

Another object of the invention is to provide a brake fluid supplying device which makes it possible for bleeding a brake line of a motor vehicle brake system without assistance.

A further object of the invention is to provide a brake fluid draining and refilling device for brake systems of motor vehicles which is of a simple and economical construction.

With these and other objects and advantages in view the invention embodies a container having a conical shaped upper end with a threaded neck extended therefrom and with the bottom of the container extended upwardly into the container providing a funnel and having a plug threaded with an opening therein, a hose connection for connecting the container through the threaded neck thereof to the master cylinder of a brake system, and a hook for suspending the container from supporting means in a vehicle.

Other features and advantages of the invention will appear from the following description taken in connection with the drawing, wherein:

Figure 1 is an elevational view showing the container positioned above and connected to a master cylinder of a brake system with parts broken away and shown in section.

Figure 2 is a side elevational view of the container also with parts broken away and showing the container in an upright position.

Figure 3 is an elevational view of a tube for connecting the container to the master cylinder with part of the tube broken away.

Figure 4 is a detail illustrating a hook for suspending the container from a supporting part of a motor vehicle.

Referring now to the drawing wherein like reference characters denote corresponding parts the brake fluid device of this invention includes a container 10, a tube 11 for connecting the container to a master cylinder, as indicated by the numeral 12, and a hook 13 for supporting the container in a motor vehicle.

The container 10 is formed with a conical shaped upper end 14 having a threaded nipple 15 extended therefrom and a cap 16 having a knurled outer surface is threaded on the nipple for retaining the brake fluid in the container.

The opposite end or bottom of the container is formed with an inwardly extended wall 17 and the wall is provided with a threaded nipple 18 in which a plug 19 which is provided with a head 20 having a screwdriver slot 21 therein is threaded, as illustrated in Fig. 2.

The container 10 is provided with a strap 22 forming a clamp, and flanges 23 and 24 on the ends thereof are secured together by a bolt 25 having a nut 26 thereon.

With the container positioned as illustrated in Fig. 1 the lower end 27 of the hook 13 is extended around the bolt 25 and the upper end 28 of the hook is positioned over a panel, which in the design shown in Fig. 1, is indicated by the dot and dash lines 29.

One end of the tube 11 is provided with a freely rotatable coupling 30 by which the tube is attached to the threaded nipple 15 on the upper end of the container, with the cap 16 removed, and the opposite end of the tube is provided with a plug 31 which is formed with flat wrench receiving sides 32 and, as illustrated in Fig. 1 the plug is threaded into the filling opening, as indicated by the numeral 33 of the master cylinder 12.

With the parts arranged in this manner the container 10 is inserted and with the plug 19 removed brake fluid from a drain valve in a brake system is drained into the funnel shaped upper end 17 of the container, with the container in an inverted position whereby the fluid passes into the container and when it is desired to replenish the brake fluid in the master cylinder the tube 11 is attached to the threaded nipple 15 of the container and the plug 31 is threaded into the filling opening 33 of the master cylinder.

By retaining the container 10 in this position with the hook 13 held over a supporting part of the vehicle the liquid level in the master cylinder is retained which permits all of the brake fluid in the brake line to be drained, without the inconvenience of continuously replacing fluid in the master cylinder.

This brake fluid attachment, therefore, makes it possible for a mechanic or other operator to drain brake fluid from a brake system in one operation and by making only one trip under the vehicle.

It will be understood that modifications may be made in the design and arrangements of the parts without departing from the spirit of the invention.

What is claimed is:

1. A brake fluid container comprising a hollow cylindrical body having a conical shaped upper end with a threaded nipple extended therefrom and a funnel like lower end extended upwardly into the body and having an internally threaded nipple extended upwardly therefrom, a clamp positioned around the said body and provided with flanges, a bolt spaced from the wall of the body and extended through the flanges extended from the ends of the clamp, a hook having oppositely disposed U-shaped ends for supporting the container by the bolt or clamp in a motor vehicle, a tube having a coupling member on one end for attaching the tube to the threaded nipple extended from the conical shaped end of the body, and a threaded plug on the opposite end adapted to be inserted into a filling opening of a master cylinder of the brake system of a motor vehicle.

2. In a brake fluid attachment, the combination which comprises a hollow cylindrical body having a conical shaped upper end with a threaded nipple extended therefrom and a funnel shape lower end extended upwardly into the body and having an internally threaded nipple extended upwardly therefrom, a clamp positioned around said body and having a bolt spaced from the wall of the body and extended through flanges extended from the ends of the clamp, a hook having oppositely disposed U-shaped ends for supporting the container by the bolt of the clamp in a motor vehicle, a flexible tube having a coupling member on one end for attaching the tube to the threaded nipple extended from the conical shaped end of the body, and a threaded plug on the opposite end adapted to be inserted into a filling opening of a master cylinder of the brake system of a motor vehicle.

JOSEPH RADUS.

REFERENCES CITED

The following references are of record in the file of this patent:

UNITED STATES PATENTS

| Number | Name | Date |
| --- | --- | --- |
| 2,181,073 | Schafer et al. | Nov. 21, 1939 |
| 2,241,183 | Dick | May 6, 1941 |

OTHER REFERENCES

"Tools and Equipment," issue of May 1939, publication of Wagner Electric Co., page 1.